US010737670B2

(12) United States Patent
Toyoda et al.

(10) Patent No.: US 10,737,670 B2
(45) Date of Patent: Aug. 11, 2020

(54) VEHICLE BRAKE HYDRAULIC CONTROL DEVICE

(71) Applicant: NISSIN KOGYO CO., LTD., Tomi, Nagano (JP)

(72) Inventors: Masahiro Toyoda, Tomi (JP); Teruyoshi Yamakawa, Tomi (JP)

(73) Assignee: NISSIN KOGYO CO., LTD., Tomi (JP)

( * ) Notice: Subject to any disclaimer, the term of this patent is extended or adjusted under 35 U.S.C. 154(b) by 0 days.

(21) Appl. No.: 16/082,827

(22) PCT Filed: Feb. 28, 2017

(86) PCT No.: PCT/JP2017/007926
§ 371 (c)(1),
(2) Date: Sep. 6, 2018

(87) PCT Pub. No.: WO2017/169475
PCT Pub. Date: Oct. 5, 2017

(65) Prior Publication Data
US 2019/0092293 A1    Mar. 28, 2019

(30) Foreign Application Priority Data
Mar. 31, 2016 (JP) .................................. 2016-073548

(51) Int. Cl.
*B60T 8/172*   (2006.01)
*B60T 8/1761*  (2006.01)
(Continued)

(52) U.S. Cl.
CPC ............ *B60T 8/172* (2013.01); *B60T 8/1761* (2013.01); *B60T 8/1763* (2013.01);
(Continued)

(58) Field of Classification Search
CPC .. B60T 8/1761; B60T 8/1763; B60T 8/17636; B60T 8/1764; B60T 8/344
See application file for complete search history.

(56) References Cited

U.S. PATENT DOCUMENTS 4,881,784 A * 11/1989 Leppek ............... B60T 8/17636
                                                303/162
5,664,850 A *  9/1997 Kuno ....................... B60L 3/102
                                                303/150
(Continued)

FOREIGN PATENT DOCUMENTS

JP   H02-267064 A   10/1990
JP   04-356261       12/1992
(Continued)

OTHER PUBLICATIONS

International Search Report, dated Jun. 6, 2017 (dated Jun. 6, 2017), 1 page.
(Continued)

*Primary Examiner* — Vishal R Sahni
(74) *Attorney, Agent, or Firm* — Rankin, Hill & Clark LLP

(57) ABSTRACT

A brake fluid pressure control device for a vehicle that can perform fluid pressure control on the brake fluid pressure applied to wheel brakes. It is determined whether the pressure increasing time in the current pressure increasing control exceeds determination time which is set on the basis of the pressure increasing time in past pressure increasing control. If the pressure increasing time in the current pressure increasing control exceeds the determination time, it is determined that the road surface on which the vehicle is travelling has changed from the road surface with a low coefficient of friction to the road surface with a high coefficient of friction.

4 Claims, 4 Drawing Sheets

(51) Int. Cl.
    *B60T 8/1763*    (2006.01)
    *B60T 8/1764*    (2006.01)
    *B60T 8/34*      (2006.01)
    *G01N 19/02*         (2006.01)

(52) U.S. Cl.
    CPC ........ *B60T 8/1764* (2013.01); *B60T 8/17636* (2013.01); *B60T 8/344* (2013.01); *B60T 2210/12* (2013.01); *B60T 2210/124* (2013.01); *G01N 19/02* (2013.01)

(56)  References Cited

U.S. PATENT DOCUMENTS

| | | | | |
|---|---|---|---|---|
| 6,161,906 | A * | 12/2000 | Sakane | B60T 8/17636 303/113.1 |
| 2003/0028309 | A1 * | 2/2003 | Inoue | B60T 8/17636 701/81 |
| 2011/0089756 | A1 * | 4/2011 | Hirose | B60T 8/17636 303/119.1 |

FOREIGN PATENT DOCUMENTS

| | | |
|---|---|---|
| JP | H04-356261 | 12/1992 |
| JP | 5-105066 | 4/1993 |
| JP | 2682125 | 8/1997 |
| JP | 2682125 | 11/1997 |
| JP | 11-129883 | 5/1999 |
| JP | H11-129883 | 5/1999 |
| JP | 2013-209065 | 10/2013 |

OTHER PUBLICATIONS

Examination report No. 1 for standard patent application dated Apr. 5, 2019, Australian Government, IP Australia, English text, 3 pages.
European Search Report dated Sep. 23, 2019, 7 pages.
Indian Examination Report dated May 6, 2020, Application No. 201847035779, 5 pages.

* cited by examiner

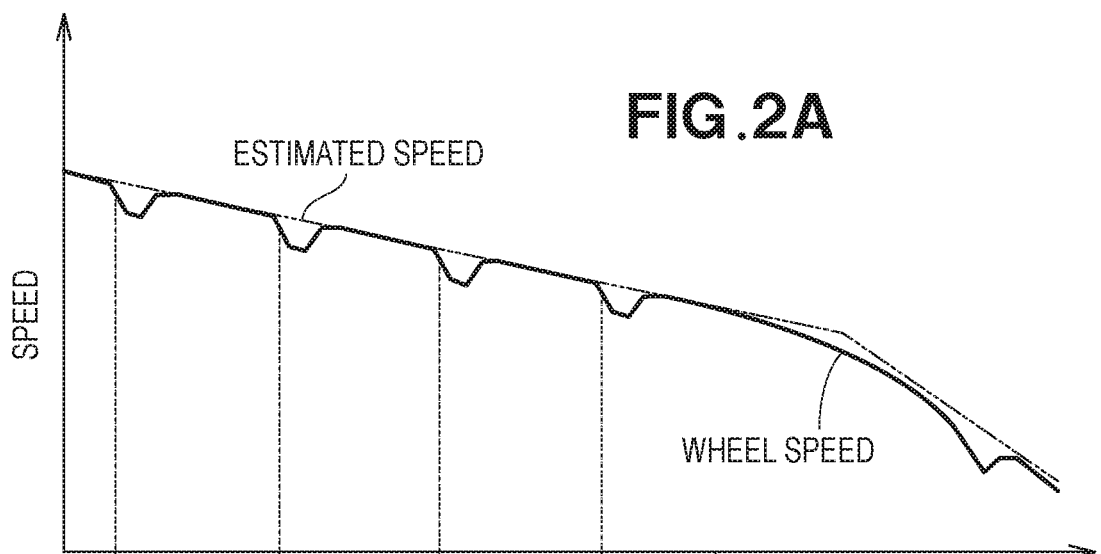
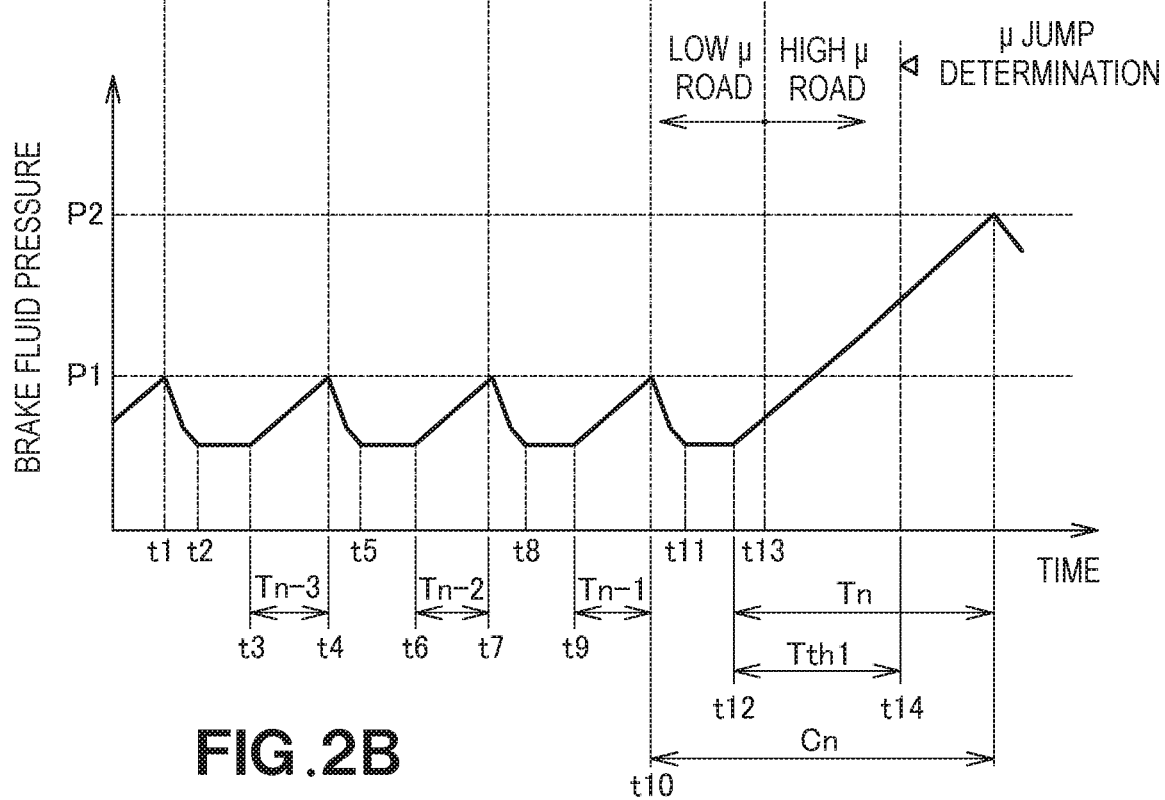

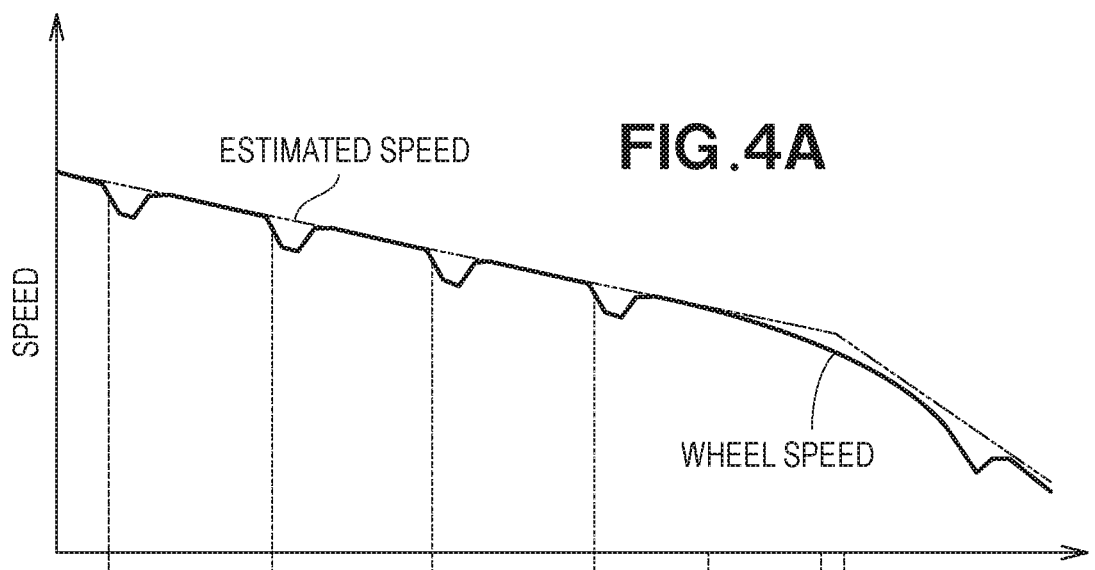
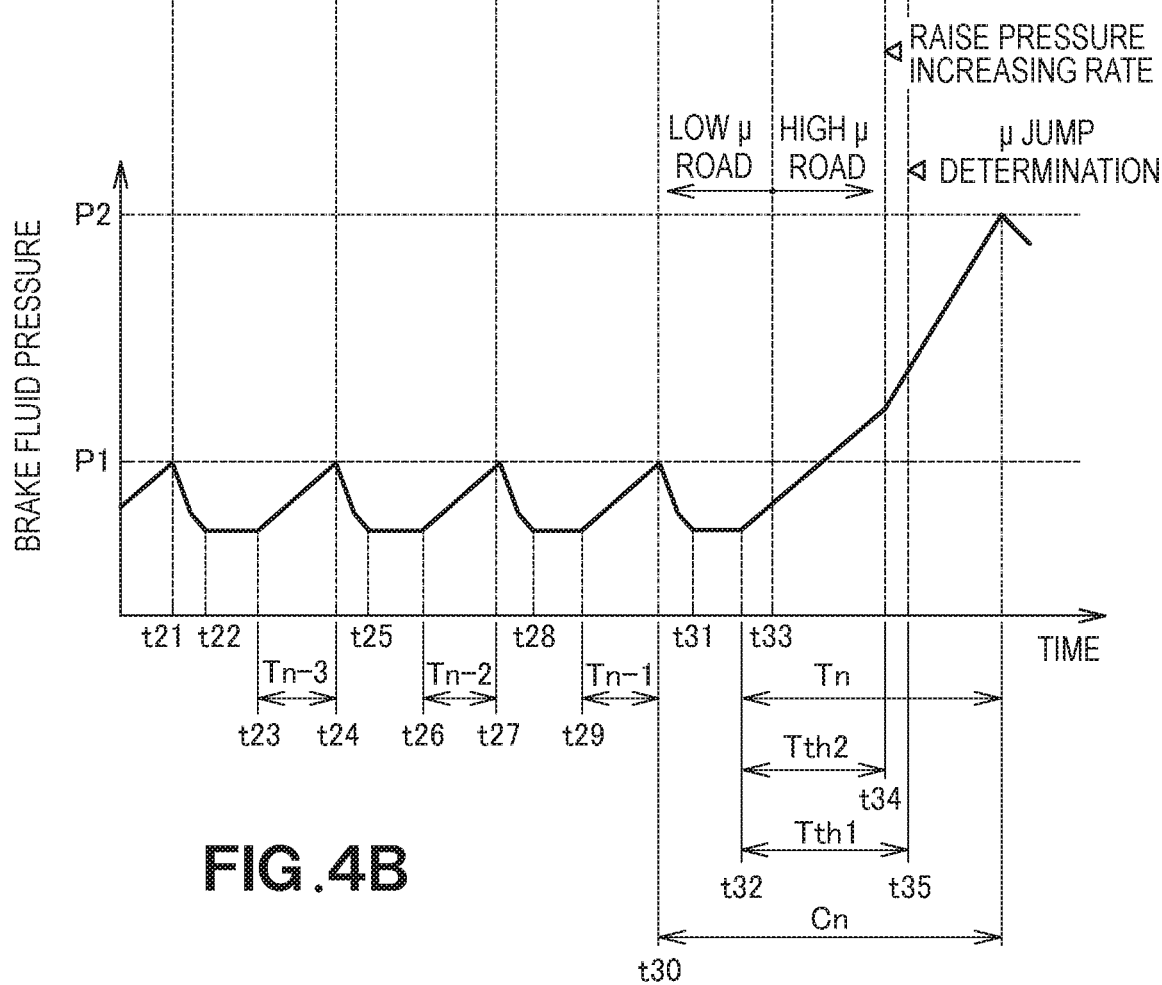

VEHICLE BRAKE HYDRAULIC CONTROL DEVICE

TECHNICAL FIELD

The present invention relates to a brake fluid pressure control device for a vehicle to determine changes in a frictional coefficient of a road surface on which the vehicle is travelling.

BACKGROUND ART

An antilock braking system (ABS) is a device to avoid locking of wheels. For example, a technique for determining whether a road surface on which a motorcycle is travelling has changed to a road surface with a high frictional coefficient from a road surface with a low frictional coefficient (whether a μ jump has occurred) is known in, for example, Patent Literature Document 1.

In the brake fluid pressure control of Patent Literature Document 1, an estimated vehicle body deceleration in a previous instance (previous control cycle) is compared to an estimated vehicle body deceleration in the current instance (current control cycle) to determine whether or not the μ jump has occurred.

In order to accurately determine the μ jump using the estimated vehicle body deceleration, however, high accuracy is also required to the estimation of the vehicle body deceleration. Thus, the processing may become complicated. In view of this, there is a demand for a technique that can accurately determine the μ jump with a simple method.

LISTING OF REFERENCES

Patent Literature Documents

Patent Literature Document 1: Japanese Patent Application Laid-Open Publication No. Hei 5-105066

SUMMARY OF THE INVENTION

Problems to be Solved by the Invention

An object of the present invention is to provide a brake fluid pressure control device for a vehicle that can accurately determine, with a simple method, whether a frictional coefficient of a road surface on which a vehicle is travelling has changed (whether the μ jump has occurred or not).

Solution to Overcome the Problems

The invention according to claim 1 is directed to a brake fluid pressure control device for a vehicle, configured to be able to perform fluid pressure control for controlling brake fluid pressure acting on a wheel brake by repeating a control cycle including, at least, pressure increasing control and pressure reducing control. The brake fluid pressure control device is configured to determine whether pressure increasing time of current pressure increasing control exceeds determination time, which is set based on pressure increasing time of past pressure increasing control, during the fluid pressure control. The brake fluid pressure control device is configured to make a determination that a road surface on which the vehicle is travelling has changed to a road surface with a high frictional coefficient from a road surface with a low frictional coefficient if the pressure increasing time of the current pressure increasing control exceeds the determination time.

The invention according to claim 2 is directed to the brake fluid pressure control device for a vehicle of claim 1, wherein a pressure increasing rate is altered to a higher value in the current pressure increasing control if the pressure increasing time of the current pressure increasing control reaches prescribed time that is shorter than the determination time.

The invention according to claim 3 is directed to the brake fluid pressure control device for a vehicle of claim 1 or 2, wherein the determination time is set based on the pressure increasing time of a predetermined number of past pressure increasing control immediately prior to the current pressure increasing control.

The invention according to claim 4 is directed to the brake fluid pressure control device for a vehicle of claim 3, wherein the determination time is set by adding a predetermined offset value to a maximum value of the pressure increasing time among a predetermined number of past pressure increasing control immediately prior to the current pressure increasing control.

Advantageous Effects of the Invention

In the invention according to claim 1, it is determined whether the pressure increasing time of the current pressure increasing control exceeds the determination time, which is set based on the pressure increasing time of the past pressure increasing control, during the fluid pressure control. Then, the brake fluid pressure control device makes a determination that the vehicle's traveling road surface has changed to a road surface with a high frictional coefficient from a road surface with a low frictional coefficient if the pressure increasing time of the current pressure increasing control exceeds the determination time.

It is possible to determine from the current and past pressure increasing time a fact that the vehicle's traveling road surface has changed to the road surface with the high frictional coefficient from the road surface with the low frictional coefficient. Thus, unlike the prior art, it is not necessary to estimate the vehicle body deceleration. It is possible to accurately determine, with a simple method, whether the vehicle's traveling road surface has changed to the road surface with the high frictional coefficient from the road surface with the low frictional coefficient (determine whether the μ jump has occurred).

In the invention according to claim 2, when the pressure increasing time of the current pressure increasing control reaches the prescribed time, which is shorter than the determination time, the pressure increasing rate is altered to a higher value in the current pressure increasing control. Because the pressure increasing rate is raised to determine the occurrence of the μ jump at the stage (point) prior to reaching the determination time, the lock-equivalent-fluid-pressure becomes considerably high if the change from the road surface with the low frictional coefficient to the road surface with the high frictional coefficient has actually occurred (if the μ jump has occurred). Thus, the current pressure increasing control continues for a while even if the pressure increasing rate is raised. As a result, the pressure increasing time of the current pressure increasing control exceeds the determination time, and it is determined that the μ jump has occurred. On the other hand, if the μ jump has not actually occurred, the brake fluid pressure will quickly reach the lock-equivalent-fluid-pressure upon raising the pressure increasing rate. Thus, the pressure increasing time of the current pressure increasing control does not exceed the determination time, and it is not determined that the μ jump has occurred. For example, in a situation that the pressure increasing time becomes longer for some reasons although the μ jump has not actually occurred, it is possible to avoid erroneous determination by intentionally raising the pressure increasing rate as described above, and to further improve the accuracy of the μ jump determination.

In the invention according to claim 3, the determination time is set based on the pressure increasing time of a predetermined number of past pressure increasing control immediately prior to the current pressure increasing control. Thus, it is possible to appropriately set the determination time, depending upon the immediately preceding operation conditions and variations in the frictional coefficient of the traveling road surface, and further improve the determination accuracy.

In the invention according to claim 4, the determination time is set by adding the predetermined offset value to the maximum value of the pressure increasing time among a predetermined number of past pressure increasing control immediately prior to the current pressure increasing control. Thus, it is possible to avoid the erroneous determination more reliably by appropriately setting the offset value.

BRIEF DESCRIPTION OF THE DRAWINGS

FIG. 2A depicts a correlation diagram between time and speed.

FIG. 2B depicts a correlation diagram between time and brake fluid pressure.

FIG. 4A describes a modification to the FIG. 2A embodiment.

FIG. 4B describes a modification to the FIG. 2B embodiment.

MODE FOR CARRYING OUT THE INVENTION

An embodiment of the present invention will be described below with reference to the accompanying drawings.

Embodiment(s)

Figure 1:
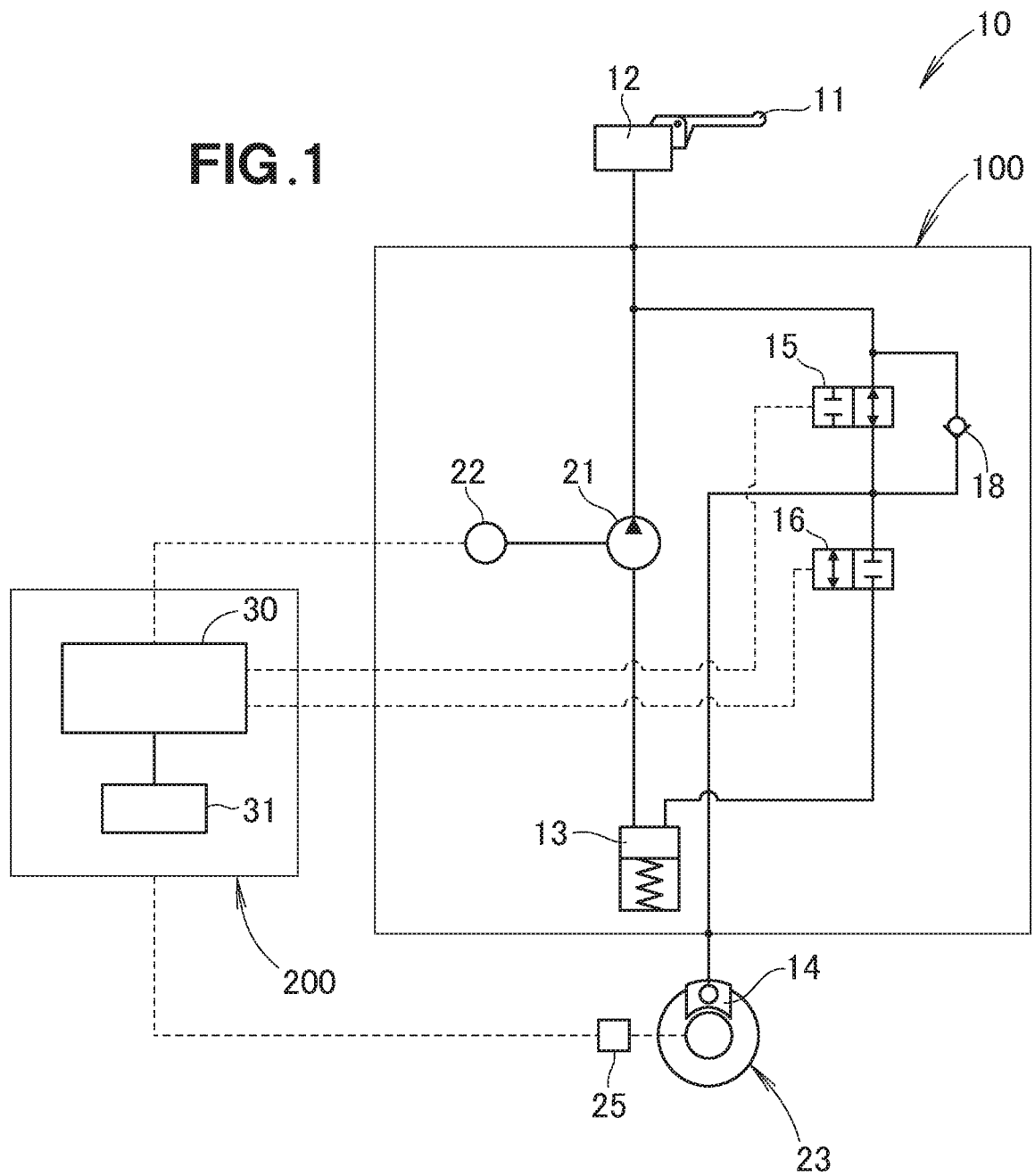
FIG. 1 is a fluid pressure circuit diagram of a brake fluid pressure control device for a vehicle, according to an embodiment of the present invention.

As shown in FIG. 1, a brake fluid pressure control device 10 for a vehicle is configured to appropriately control a braking force (brake fluid pressure) applied onto wheels of the vehicle. In this embodiment, described is an example in which the brake fluid pressure control device is mounted on a bar handle vehicle, and applied on a front wheel of, for example, a two-wheel vehicle.

The brake fluid pressure control device for a vehicle 10 includes, as its major elements, a fluid pressure unit 100, which has fluid passages (brake fluid passages) and various parts, and a control device 200 to control various parts in the fluid pressure unit 100. The fluid pressure unit 100 is arranged between a master cylinder 12, which serves as a fluid pressure source, and a wheel brake 14.

The fluid pressure unit 100 includes an inlet control valve 15 (control valve means 15), which is a normally open solenoid valve disposed on a fluid pressure passage from the master cylinder 12 to the wheel brake 14, an outlet control valve 16 (control valve means 16), which is a normally closed solenoid valve disposed on the fluid pressure passage from the master cylinder 12 to the wheel brake 14, a reservoir 13 to temporarily reserve the working fluid, a check valve 18 arranged in parallel to the inlet control valve 15 to only admit the flow of the fluid toward the master cylinder 12, a pump part 21 to discharge the working fluid from the reservoir 13 toward the master cylinder 12, and an actuator (motor) 22 to drive (actuate) the pump part 21. The control device 200 includes a control device 30 configured to control the actuation of the actuator 22, and control opening and closing of the inlet control valve 15 and the outlet control valve 16. The control device 200 also includes a determination device 31 configured to determine whether the road surface on which the vehicle is traveling has changed from a road surface with a low frictional coefficient to a road surface with a high frictional coefficient (whether the μ jump has taken placed).

A wheel speed sensor 25 configured to detect the wheel speed of the wheel 23 is connected to the control device 200. The wheel speed is obtained by the determination device 31, and the estimated vehicle body speed is calculated on the basis of the wheel speed. A signal that represents the μ jump determination, which is prepared by the determination device 31, a signal that represents the wheel speed, and a signal that represents the estimated vehicle body speed are transmitted to the control device 30, and the control device 30 performs ABS control and other processing, depending upon the result of the μ jump determination. Therefore, it is possible to improve qualities of the control such as the ABS control.

Firstly, fundamental operations during normal braking and the ABS control will be described. The brake fluid pressure control device for a vehicle 10 has a function to switch between a normal state during the normal braking and states (reduced-pressure state, a holding state, and an increased-pressure state) during the ABS control.

During the normal braking: in the normal state (i.e., when no current is fed to the inlet control valve 15 and the outlet control valve 16), the master cylinder 12 communicates with the wheel brake 14 (the inlet control valve 15 is open), and the wheel brake 14 is disconnected from the reservoir 13 (the outlet control valve 16 is closed). As an operation part (activating part) 11 is manipulated, the working fluid pressure is applied to the wheel brake 14 from the master cylinder 12 through the inlet control valve 15 to brake the wheel.

During the ABS control; when the vehicle's wheel is about to lock, the control device 200 switches among the reduced-pressure state, the holding state and the increased-pressure state so as to perform the ABS control.

In the reduced-pressure state of the ABS control, the current flows to the inlet control valve 15 and the outlet control valve 16 such that the master cylinder 12 is disconnected from the wheel brake 14 (the inlet control valve 15 is closed), and the wheel brake 14 communicates with the reservoir 13 (the outlet control valve 16 is open). The working fluid flowing to the wheel brake 14 is released to the reservoir 13 through the outlet control valve 16, and therefore the working fluid pressure acting on the wheel brake 14 is reduced.

In the holding state of the ABS control, the current flows to the inlet control valve 15 only, the master cylinder 12 is disconnected from the wheel brake 14, and the wheel brake 14 is disconnected from the reservoir 13 (the inlet control valve 15 and the outlet control valve 16 are closed). The working fluid is confined in the fluid passage closed by the wheel brake 14, the inlet control valve 15 and the outlet control valve 16, and the working fluid pressure acting on the wheel brake is maintained at a constant value.

In the increased-pressure state of the ABS control, the feeding of the current to the inlet control valve 15 and the outlet control valve 16 is halted, the master cylinder 12 communicates with the wheel brake 14 (the inlet control valve 15 is open), and the wheel brake 14 is disconnected from the reservoir 13 (the outlet control valve 16 is closed).

As a result, the fluid pressure of the wheel brake 14 is increased by the working fluid pressure from the master cylinder 12. During the ABS control, the control device 200 activates the actuator 22 so that the pump 21 is activated. Accordingly, the working fluid, which is temporarily reserved in the reservoir 13, is caused to return toward the master cylinder 12.

In this manner, the brake fluid pressure control device for a vehicle 10 can perform the fluid pressure control on the brake fluid pressure that acts on the wheel brake 14 by repeating the pressure increasing control, including the control on the reduced-pressure state, the holding state and the increased-pressure state.

Now, a determination device for determining whether the road surface on which the vehicle is traveling has changed from a road surface with a low frictional coefficient (may be referred to as a low μ road) to a road surface with a high frictional coefficient (may be referred to as a high μ road) (whether the μ jump has taken placed) will be described.

FIG. 2A shows a correlation diagram between the time and the speed during the ABS control. The solid line indicates the wheel speed, and the imaginary line indicates the estimated speed of the vehicle. Tn represents the pressure increasing time of the pressure increasing control in the current control cycle (current pressure increasing control), Tn-1 represents the pressure increasing time of the pressure increasing control in a control cycle of one-cycle-before the current control cycle, Tn-2 represents the pressure increasing time of the pressure increasing control in a control cycle of two-cycles-before the current control cycle, and Tn-3 represents the pressure increasing time of the pressure increasing control in a control cycle of three-cycles-before the current control cycle.

During the ABS control, the wheel speed gradually decreases as a whole, and the estimated speed of the vehicle also gradually decreases by repeating the control cycle including the increased-pressure state, the holding state and the reduced-pressure state of the brake fluid pressure.

In FIGS. 2A and 2B, the road surface on which the vehicle is travelling is a low μ road up to the time t13. At the time t13, the road surface on which the vehicle is travelling changes to a high μ road from the low μ road.

FIG. 2A shows the wheel speed, and FIG. 2B shows the brake fluid pressure. The brake fluid pressure P1 is pressure at which the wheel tends to lock when the traveling road surface is the low μ road (this pressure may be referred to as low-μ-road lock-equivalent fluid pressure), and the brake fluid pressure P2 is pressure at which the wheel tends to lock when the traveling road surface is the high μ road (this pressure may be referred to as high-μ-road lock-equivalent pressure).

During the ABS control, if the traveling road surface is the low μ road, the brake fluid pressure is lowered by the pressure reducing control upon the brake fluid pressure reaching the low-μ-road lock-equivalent fluid pressure (time t1, t4, t7, t10). After the pressure reducing control, the brake fluid pressure is maintained at a constant value by the holding control (time t2, t5, t8, t11). Subsequently, the brake fluid pressure is raised by the pressure increasing control (time t3, t6, t9, t12). Such cycle of control is repeated.

In FIGS. 2A and 2B, the traveling road surface is a low μ road up to a certain point in time (time t13) in the current control cycle Cn. After that point in the current control cycle Cn, the road surface on which the vehicle is travelling changes to a high μ road. When the traveling road surface is the high μ road, the brake fluid pressure is increased until the brake fluid pressure reaches the-high-μ-road lock-equivalent fluid pressure P2, which is greater than low-μ-road lock-equivalent fluid pressure P1. Therefore, although the pressure increasing time Tn-3, Tn-2 and Tn-1 in those control cycles which are prior to the current control cycle does not change significantly, the pressure increasing time Tn becomes significantly long (large) in the current control cycle Cn, as compared to the pressure increasing time Tn-3, Tn-2 and Tn-1 in the immediately preceding pressure increasing control. Thus, when the pressure increasing time Tn is greater than the time Tth1 (Tn>Tth1) (time t14), it is determined that the μ jump has occurred.

A flowchart for determining whether the travelling road surface has changed to the high μ road from the low μ road for use with the above-described brake fluid pressure control device for a vehicle will be described below.

Figure 3:
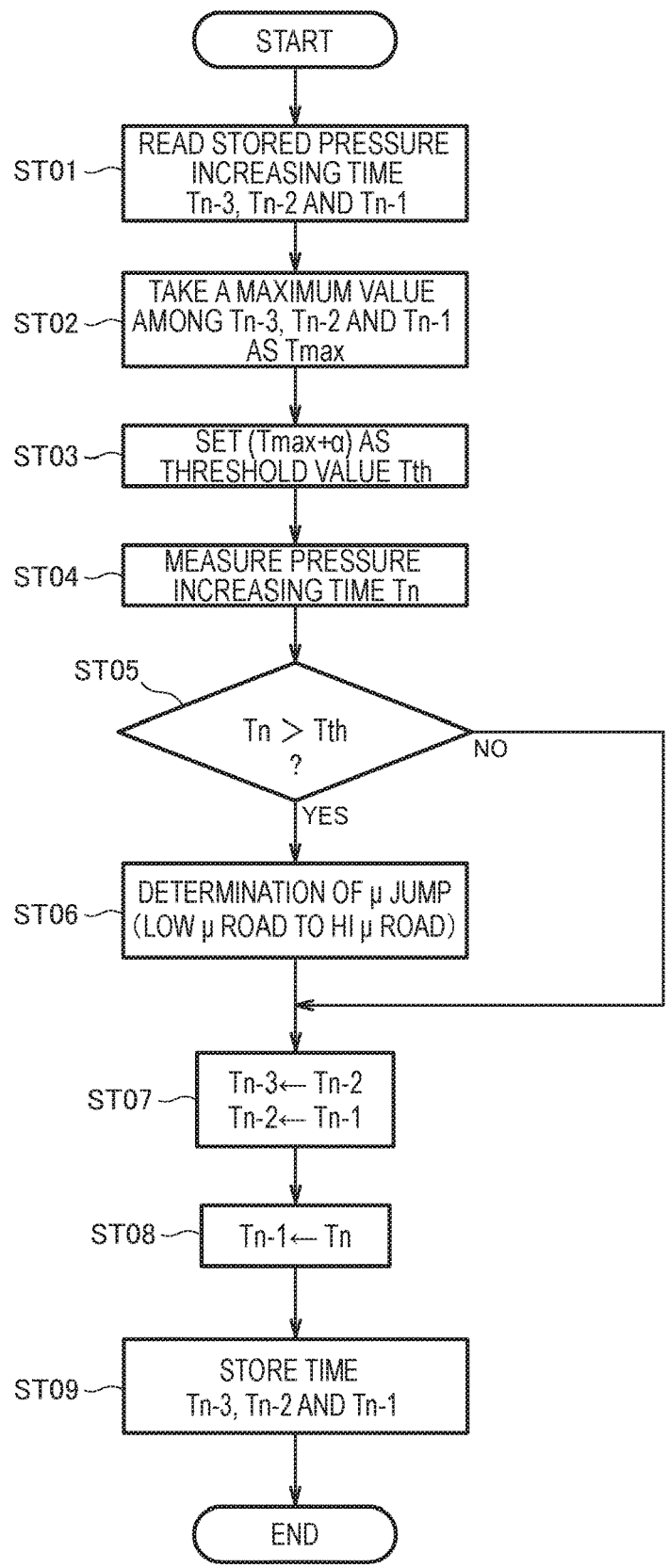
FIG. 3 is a control flowchart.

As illustrated in FIG. 3, during the ABS control, the determination device 31 reads the stored pressure increasing time Tn-3, Tn-2 and Tn-1 in the three immediately preceding pressure increasing control at Step 01 (Step is abbreviated to ST hereinafter).

At ST02, the maximum value among the pressure increasing time Tn-3, Tn-2 and Tn-1 is taken as Tmax.

At ST03, a predetermined offset value α is added to the maximum value Tmax, and the determination time Tth1 is set (Tht1=Tmax+α). Then, the determination time Tth1 is taken as a threshold value.

At ST04, the pressure increasing time Tn in the current pressure increasing control is measured.

At ST05, it is determined whether the pressure increasing time Tn of the current pressure increasing control exceeds the determination time Tth1. If the pressure increasing time Tn exceeds the determination time Tth1 (ST05: YES), the processing goes to ST06; otherwise (ST05: NO), the processing goes to ST07.

At ST06, generated is a signal that presents a fact that the frictional coefficient of the traveling road surface to the tire has changed to the high frictional coefficient (high μ) from the low frictional coefficient (low μ) (i.e., the μ jump has occurred). Then, the processing goes to ST07.

After ST06 or when it is determined at ST05 that Tn is equal to or smaller than Tth1 (Tn≤Tth1), then at ST07 the pressure increasing time Tn-2 of the pressure increasing control of two-cycles-before the current pressure increasing control is rewritten to Tn-3, and the pressure increasing time Tn-1 of the pressure increasing control of one-cycle-before the current pressure increasing control is rewritten to Tn-2.

At ST08, the value of time Tn-1 is rewritten to the pressure increasing time Tn of the current pressure increasing control.

At ST09, the pressure increasing time Tn-3, Tn-2 and Tn-1 obtained upon rewriting is stored, and the processing ends.

As described above, it is determined during the fluid pressure control whether the pressuring increasing time Tn of the current pressure increasing control exceeds the determination time Tth1 (Tmax+α), which is set on the basis of the pressure increasing time Tn-3, Tn-2 and Tn-1 of the past pressure increasing control. If the pressuring increasing time Tn of the current pressure increasing control exceeds the determination time Tth1 (Tmax+α), the control device makes a determination that the road surface on which the vehicle is travelling has changed to the road surface with the high frictional coefficient from the road surface with the low frictional coefficient.

In this manner, it is possible to determine from the current and past pressure increasing time whether the road surface on which the vehicle is travelling has changed to the road surface with the high frictional coefficient from the road surface with the low frictional coefficient. Therefore, unlike the prior art, it is not necessary to estimate the deceleration of the vehicle body, and it is possible accurately determine, with a simple method, whether the road surface on which the vehicle is travelling has changed the road surface with the high frictional coefficient from the road surface with the low frictional coefficient (whether the μ jump has occurred).

Furthermore, because the pressure increasing rate is raised to determine the occurrence of the μ jump at a stage prior to reaching the determination time, the lock-equivalent-fluid-pressure becomes considerably high if the μ jump has actually occurred (the change from the road surface with the low frictional coefficient to the road surface with the high frictional coefficient has actually occurred). Thus, even if the pressure increasing rate is raised, the current pressure increasing control continues for a while. As a result, the pressure increasing time of the current pressure increasing control exceeds the determination time, and it is determined that the μ jump has occurred. On the other hand, if the μ jump has not actually occurred, the brake fluid pressure will quickly reach the lock-equivalent-fluid-pressure upon raising the pressure increasing rate. Thus, the pressure increasing time of the current pressure increasing control does not exceed the determination time, and the determination of the occurrence of the μ jump is not made. For example, in a situation that the pressure increasing time becomes longer for some reasons although the μ jump has not actually occurred, it is possible to avoid erroneous determination by intentionally raising the pressure increasing rate as described above, and further improve the accuracy of the μ jump determination.

It should be noted that although the determination time is set on the basis of the three pressure increasing time of the pressure increasing control in the three immediately preceding control cycles in the embodiment, the present invention is not limited to this. The determination time may be set on the basis of arbitrary pressure increasing time of the past pressure increasing control, e.g., the single or two pressure increasing time in the single or two immediately preceding control cycle, the five or more pressure increasing time in the five or more immediately preceding control cycles, or the three pressure increasing time in the three control cycles immediately prior to the immediately preceding control cycle.

It should also be noted that although the determination time is decided by adding the predetermined offset to the maximum value of the pressure increasing time among a predetermined number of pressure increasing control immediately prior to the current pressure increasing control in the embodiment, the present invention is not limited to this. For example, the determination time may be decided by adding a predetermined offset value to an average value of the pressure increasing time in a predetermined number of past pressure increasing control. It should also be noted that although the determination time may be decided by adding the offset value to the above-mentioned maximum value, the above-mentioned average value or a value of arbitrary pressure increasing control, the present invention is not limited to them. For example, the determination time may be decided by multiplying the above-mentioned maximum value, the above-mentioned average value or the value of arbitrary pressure increasing control by a predetermined coefficient such as 1.1 or 1.2.

Now, a modification to the determination device will be described.

FIGS. 4A and 4B are views useful to describe a modification to the embodiment of FIGS. 2A and 2B. The modification is different from the above-described embodiment in that the pressure increasing rate is raised when the prescribed time Tth2, which is shorter than the determination time Tth1, is reached in the current control cycle.

During the ABS control, if the traveling road surface is a low μ road, the brake fluid pressure is reduced by the pressure reducing control upon the brake fluid pressure reaching the low-μ-road lock-equivalent-liquid-pressure (time t21, t24, t27, t30). After the pressure reducing control, the brake fluid pressure is maintained at a constant value by the holding control (t22, t25, t28, t31). Subsequently, the brake fluid pressure is increased by the pressure increasing control (time t23, t26, t29, t32). Such cycle of control is repeated.

In FIGS. 4A and 4B, the traveling road surface is the low μ road up to a certain point in time (time t33) in the current control cycle Cn. After that point in the current control cycle Cn, the road surface on which the vehicle is travelling changes to the high μ road. When the travelling road surface is the high μ road, the fluid pressure is increased until the fluid pressure reaches the high-μ-road lock-equivalent-liquid-pressure P2, which is greater than the low-μ-road lock-equivalent-liquid-pressure P1. Therefore, although the pressure increasing time Tn-3, Tn-2 and Tn-1 do not change significantly in those control cycles which are prior to the current control cycle, the pressure increasing time Tn considerably becomes longer (larger) in the current control cycle Cn, as compared to the pressure increasing time Tn-3, Tn-2 and Tn-1 in the immediately preceding pressure increasing control. Thus, when the pressure increasing time Tn is greater than the time Tth1 (Tn>Tth1) (time t35), it is determined that the μ jump has occurred.

Because the pressure increasing rate is raised to determine the occurrence of the μ jump at a stage prior to reaching the determination time, the lock-equivalent-fluid-pressure becomes considerably high if the μ jump has actually occurred (the change from the road surface with the low frictional coefficient to the road surface with the high frictional coefficient has actually occurred). Thus, even if the pressure increasing rate is raised, the current pressure increasing control continues for a while. As a result, the pressure increasing time of the current pressure increasing control exceeds the determination time, and it is determined that the μ jump has occurred. On the other hand, if the μ jump has not actually occurred, the brake fluid pressure will quickly reach the lock-equivalent-fluid-pressure upon raising the pressure increasing rate. Thus, the pressure increasing time of the current pressure increasing control does not exceed the determination time, and the determination of the occurrence of the μ jump is not made. For example, in a situation that the pressure increasing time becomes longer for some reasons although the μ jump has not actually occurred, it is possible to avoid erroneous determination by intentionally raising the pressure increasing rate as described above, and further improve the accuracy of the μ jump determination.

It should be noted that although the embodiment has described an example in which the wheel brake fluid pressure control device is disposed only on the front wheel, the wheel brake fluid pressure control device may be disposed only on the rear wheel or both of the wheels.

INDUSTRIAL APPLICABILITY

The present invention is advantageously applied to the brake fluid pressure control device mounted on the motorcycle.

REFERENCE NUMERALS

10: Brake fluid pressure control device for a vehicle
14: Wheel brake
21: Pump (solenoid pump)
30: Control device
31: Determination device
Tn: Pressure increasing time in the current pressure increasing control
Tn-1, Tn-2, Tn-3: Pressure increasing time in the past pressure increasing control
Tth1 (Tmax+α): Determination time

What is claimed is:

1. A brake fluid pressure control device for a vehicle, configured to be able to perform fluid pressure control for controlling brake fluid pressure acting on a wheel brake by repeating a control cycle including, at least, a pressure increasing control and a pressure reducing control,
   the brake fluid pressure control device is configured to determine whether a pressure increasing time of a current pressure increasing control exceeds a determination time, wherein said determination time is based on a pressure increasing time of at least one past pressure increasing control, and
   the brake fluid pressure control device is configured to determine that a road surface on which the vehicle is travelling has changed to a road surface with a high frictional coefficient from a road surface with a low frictional coefficient when the pressure increasing time of the current pressure increasing control exceeds the determination time,
   wherein a pressure increasing rate is increased in the current pressure increasing control when the pressure increasing time of the current pressure increasing control reaches a prescribed time that is shorter than the determination time.

2. The brake fluid pressure control device for a vehicle according to claim 1, wherein the determination time is based on a predetermined number of pressure increasing times resulting from a corresponding predetermined number of past pressure increasing controls occurring immediately prior to the current pressure increasing control.

3. The brake fluid pressure control device for a vehicle according to claim 2, wherein the determination time is set by adding a predetermined offset value to a maximum value of the pressure increasing time occurring in the predetermined number of past pressure increasing controls occurring immediately prior to the current pressure increasing control.

4. A brake fluid pressure control device for a vehicle, configured to be able to perform fluid pressure control for controlling brake fluid pressure acting on a wheel brake by repeating a control cycle including, at least, a pressure increasing control and a pressure reducing control,
   the brake fluid pressure control device is configured to determine whether a pressure increasing time of a current pressure increasing control exceeds a determination time, wherein said determination time is based on a pressure increasing time of at least one past pressure increasing control,
   the brake fluid pressure control device is configured to determine that a road surface on which the vehicle is travelling has changed to a road surface with a high frictional coefficient from a road surface with a low frictional coefficient when the pressure increasing time of the current pressure increasing control exceeds the determination time,
   wherein the determination time is based on a predetermined number of pressure increasing times resulting from a corresponding predetermined number of past pressure increasing controls occurring immediately prior to the current pressure increasing control, and
   wherein the determination time is set by adding a predetermined offset value to a maximum value of the pressure increasing time occurring in the predetermined number of past pressure increasing controls occurring immediately prior to the current pressure increasing control.

* * * * *